United States Patent
Betremieux et al.

(10) Patent No.: US 6,830,657 B1
(45) Date of Patent: Dec. 14, 2004

(54) HYDROPHOBIC CATIONIC DISPERSIONS STABILIZED BY LOW MOLECULAR WEIGHT MALEIMIDE COPOLYMERS, FOR PAPER SIZING

(75) Inventors: Isabelle Betremieux, Coye la Foret (FR); Christophe Dumousseaux, Villejuif (FR); Bruno Feret, Saint Gratien (FR); Jean-Jacques Flat, Serquigny (FR)

(73) Assignee: Atofina, Puteaux (FR)

( * ) Notice: Subject to any disclaimer, the term of this patent is extended or adjusted under 35 U.S.C. 154(b) by 3 days.

(21) Appl. No.: 10/019,161

(22) PCT Filed: Jun. 20, 2000

(86) PCT No.: PCT/FR00/01692

§ 371 (c)(1),
(2), (4) Date: Mar. 1, 2002

(87) PCT Pub. No.: WO00/78818

PCT Pub. Date: Dec. 28, 2000

(30) Foreign Application Priority Data

Jun. 21, 1999 (FR) .............................. 99 07910

(51) Int. Cl.$^7$ ........................ D21H 21/16; D21H 17/45; C08F 2/28
(52) U.S. Cl. ............... 162/168.2; 162/168.4; 162/158
(58) Field of Search .............. 162/158, 164.1, 162/164.6, 166, 167, 168.1, 168.2, 168.4, 175; 526/203, 258, 318.45, 318.6, 329.2, 334, 343, 344.2, 345, 346, 79, 87, 915; 516/9, 20, 21, 26, 198, 201, 28, 203–204, 905, 923, 914, 917; 524/460, 458, 548

(56) References Cited

U.S. PATENT DOCUMENTS

| | | | |
|---|---|---|---|
| 3,444,151 A | | 5/1969 | Verdol |
| 4,290,931 A | * | 9/1981 | Nolken et al. ............... 524/123 |
| 4,337,185 A | * | 6/1982 | Wessling et al. ............ 524/458 |
| 4,421,892 A | * | 12/1983 | Kasahara et al. ........... 524/514 |
| 4,820,773 A | * | 4/1989 | Alexander et al. .......... 525/274 |
| 4,868,259 A | * | 9/1989 | Burroway et al. .......... 526/203 |
| 5,134,188 A | * | 7/1992 | Blum et al. ................. 524/548 |
| 5,731,385 A | * | 3/1998 | Knors et al. ............. 525/327.6 |
| 6,225,395 B1 | * | 5/2001 | Nzudie et al. .............. 524/458 |

FOREIGN PATENT DOCUMENTS

| | | | | |
|---|---|---|---|---|
| DE | 4010794 A1 | * | 4/1981 | ........... C08G/81/02 |
| DE | 3037520 A1 | * | 10/1991 | ............. C08F/8/32 |
| EP | 755983 A2 | * | 1/1997 | ......... C08L/101/00 |
| EP | 0810323 | | 12/1997 | |
| EP | 915103 A1 | * | 5/1999 | ........... C08F/02/28 |

* cited by examiner

Primary Examiner—José A Fortuna
(74) Attorney, Agent, or Firm—Cozen O'Connor P.C.; Michael B. Fein; Brian L. Belles

(57) ABSTRACT

The invention concerns a method for obtaining an aqueous dispersion of hydrophobic polymers dispersed in the form of particles with mean diameter less than 100 nm stablized soley with a macromolecular surfactant based on low molecular weight styrene/maleic anhydride imide copolymer. The invention also concerns the use of said dispersion for treating and sizing paper.

18 Claims, No Drawings

HYDROPHOBIC CATIONIC DISPERSIONS STABILIZED BY LOW MOLECULAR WEIGHT MALEIMIDE COPOLYMERS, FOR PAPER SIZING

This application is a National Stage under 35 U.S.C. 3.71 of PCT/FR00/01692 filed Jun. 20, 2000 which claimed benefit of French application FR 9907910 filed Jun. 21, 1999.

BACKGROUND OF THE INVENTION

The present invention relates to the field of the sizing of paper and in particular to sizing agents based on an aqueous cationic dispersion of hydrophobic polymers. It also relates to the process for producing such dispersions.

A good sizing agent is desired for every kind of paper, in particular printing and writing paper, paper for labels, wastepaper and wrapping paper.

Two kinds of sizing agents generally exist: surface or internal sizing agents. The term "surface sizing agent" is understood to mean an agent applied at the surface of papers, generally in conjunction with starch, using a size press; on the other hand, the term "internal sizing agent" is understood to mean an agent added with the fibres in the wet part of the manufacture of the paper.

A good surface sizing agent allows paper manufacturers to obtain a paper with good resistance to water while reducing and even sometimes eliminating internal sizing, which requires a larger amount of product than surface sizing. It also makes it possible to obtain a paper with good surface properties, which are particularly important in obtaining good printability properties on papers.

It is now known to a person skilled in the art to use, as surface sizing agent, emulsified or dispersed polymers, in combination with starch, in preference to dissolved polymers. They make it possible to obtain sizing agents having a high solids content with a low viscosity. They cause less of a foaming problem than dissolved polymers of the styrene-acrylic acid or styrene-maleic anhydride type, for example. These dispersions can be anionic or cationic, the latter being less common and more difficult to synthesize.

As far as internal sizing agents are concerned, a person skilled in the art is looking for a product which can be used without a retention agent and without a maturing stage. The commonest internal sizing agents are alkyl ketene dimer (AKD), alkyl succinic anhydrides (ASA) and colophonies. They are not suitable under all manufacturing conditions and with regard to all types of pulps and sometimes require the use of a cationic promoter.

Surface sizing agents are known to a person skilled in the art and exist in the form of anionic dispersions. They are copiously described in the literature. They are synthesized by emulsion polymerization using an anionic copolymer of low molecular mass as emulsifier. It is known to a person skilled in the art that the absence of surfactant during the synthesis and a very fine particle size are preferable in obtaining satisfactory effectiveness during the surface treatment. U.S. Pat. No. 08,434,600 discloses, for example, the emulsion synthesis from styrene-acrylic acid copolymers used without cosurfactant to give emulsions with a particle size of 65 nm, while Patent FR 9606737 claims the use of dispersions with a size of approximately 55 nm synthesized using styrene-maleic anhydride (SMA) copolymers.

On the other hand, these anionic emulsions have certain disadvantages. In particular, they show little attachment to cellulose fibres which are slightly anionic, which causes recycling problems in closed circuits. A high dosage is necessary in order to obtain good sizing properties, because a portion of the dispersion does not remain at the surface and spreads throughout the thickness of the paper sheet. Furthermore, such anionic emulsions are not compatible with some starches, such as, for example, cationic starches.

Cationic dispersions have therefore been envisaged as sizing agents. Several methods of synthesis are possible. That which proves to be the most relevant and which the present invention relates to is emulsion polymerization using a cationic copolymer of low mass. Patent DE 2,454,397 claims the use of oligomers based mainly on styrene and on dimethylaminoethyl acrylate which are synthesized in an organic solvent. Patent DE 3,401,573 claims the use of styrene, acrylonitrile and dimethylaminoethyl acrylate or methacrylate terpolymers. These two processes have the disadvantage of using an organic solvent which has to be removed before or after the emulsion polymerization. They are therefore neither economical nor ecological. Furthermore, there may be problems of stability of the emulsion at high temperatures typical of sizing baths or at a high shear gradient. Another patent, Patent DE 4,200,715, claims the use of a hydrophobic modified cationic polyamidoamine. This process results in emulsions with a very low solids content and with particle sizes of about 160 nm. These emulsions are therefore neither economical nor effective in the present application.

According to the prior art, it therefore proves to be impossible to use, as sizing agent, cationic emulsions which have a high solids content, which have a fine particle size and which are synthesized without organic solvent or surfactant.

U.S. Pat. No. 3,444,151 discloses, however, the synthesis of imide derivatives (II) of copolymers based on maleic anhydride (I) and claims their use in emulsion polymerization for the purpose of latex synthesis. However, this patent claims the use of compound (II) in a proportion of 2 to 20% by weight with respect to the monomers, which is in fact insufficient for the purpose of obtaining correctly stabilized latices in the absence of conventional surfactant (the examples taken up in the patent are, moreover, all based on the joint use of conventional surfactant).

SUMMARY OF THE INVENTION

The present invention provides a simple process for the synthesis of cationic emulsions and for the application of these emulsions to paper, which give much better results than the equivalent anionic emulsions.

The present invention is distinguished from the prior art in that it uses cationic emulsions of a novel type which are intended to be used as sizing agent, which emulsions are obtained in the presence of imide derivatives (II) of copolymers based on maleic anhydride which are used in sufficient proportions to avoid recourse to conventional surfactants. The emulsions thus synthesized have high hydrophobicity, a fine particle size, a high solids content, weak foaming and good mechanical stability, good stability towards freezing/thawing and good stability at high temperatures. They can be used equally well as surface sizing agent and as internal sizing agent. In the surface application, they are compatible with a large number of starches. In the internal application, they make possible immediate sizing without the use of a retention agent.

The invention therefore relates to the application, as sizing agents for papers, of cationic dispersions resulting from the emulsion polymerization of a mixture of mainly hydrophobic monomers in the presence of an aqueous solution of imide derivatives of copolymers based on maleic anhydride of low molecular mass and in the absence of conventional surfactant. Emulsion synthesis using these copolymers results in strongly hydrophobic cationic dispersions, with a high solids content and with a low particle size, which confer both very good hydrophobicity on the papers treated and good ink-jet printability.

DETAILED DESCRIPTION

One of the subject-matters of the invention is the aqueous dispersion of hydrophobic polymers which can be used alone or in combination with other agents as sizing agent for paper. It can be obtained according to the process described hereinbelow, which itself constitutes another subject-matter of the invention.

The process for producing the aqueous dispersion used as sizing agent for papers is carried out by emulsion polymerization starting from an imide derivative (II) of a copolymer based on maleic anhydride. The synthesis of these derivatives, based on the reaction of a diamine and of a polymer (I) based on maleic anhydride, is disclosed in U.S. Pat. No. 3,444,151. Briefly, these imide derivatives are obtained by reaction between a polymer (I) and a primary tertiary diamine, for example dimethylpropylenediamine (DMAPA), preferably by a bulk process. The primary amine functional group will react with the anhydride functional group to form an amic acid and then this ring will reclose to form an imide derivative (II) of the polymer (I). The amine derivatives used in this invention are preferably those of the type I disclosed in U.S. Pat. No. 3,444,151, that is to say those where a diamine reacts completely with the anhydride functional group with a molar ratio of 1 to 1. The use of copolymers exhibiting residual anhydride or acid functional groups, resulting from a reaction with a deficiency of amine, is also possible.

The polymer (I) can be a copolymer or a terpolymer composed of maleic anhydride and of hydrophobic monomers chosen from α-olefins, unsaturated ethylenic aromatics, vinyl ethers or allyl ethers. The preferred copolymer of the invention is a copolymer of styrene and of maleic anhydride (SMA) with a styrene to maleic anhydride ratio of 1/1 to 6/1, preferably of 2/1 to 4/1. The number-average molecular mass of the emulsifying copolymer is between 500 and 20,000, preferably between 2000 and 5000. The percentage by mass of this oligomer in the final dry matter is between 10% and 40%, preferably between 20% and 30%.

The polymer (I) will preferably be chosen from copolymers of styrene and of maleic anhydride having acid numbers ranging from 500 to 200 mg KOH/g and sold by the company Elf Atochem under the names of SMA® 1000, SMA® 2000, SMA® 3000, SMA® EF30, and SMA® EF40 and SMA® EF60.

After imidization, the copolymer is subsequently dissolved in aqueous solution and neutralized with an acid to give a cationic emulsifying oligomer. The acid used will preferably be a volatile weak acid, such as ethanoic or methanoic acid.

The cationic emulsion is then synthesized, using conventional techniques for emulsion polymerization, in an aqueous solution comprising an appropriate amount, preferably 30 to 50% with respect to the monomers, of the cationic emulsifier (II) described above and without addition of conventional macromolecular surfactant, in the presence of a conventional radical initiating system and of a mixture of ethylenically unsaturated monomers, for example composed of styrene and of (meth)acrylic esters.

The radical initiator can be a water-soluble initiator, such as ammonium, potassium or sodium persulphates, optionally used in combination with a reducing agent of sodium metabisulphite type, or alternatively hydrogen peroxide or a hydroperoxide, such as tert-butyl hydroperoxide, in combination with a reducing agent, such as ascorbic acid or sodium formaldehydesulphoxylate. This initiator can also be soluble in organic media, such as azo derivatives, for example azobisisobutyronitrile, or organic peroxides.

The polymerization temperature is between 30° C. and 100° C., preferably between 60° C. and 90° C., and will be adjusted to the initiating system used.

The monomers are chosen in particular so as to obtain the desired glass transition temperature (Tg) but also the desired polarity, the desired functionality or the desired degree of cross-linking. This Tg can be between −70° C. and 100° C., preferably between 0° C. and 50° C.

By way of example, the monomers will be chosen from methyl acrylate, ethyl acrylate, butyl acrylate, 2-ethylhexyl acrylate, methyl methacrylate and more generally alkyl (meth)acrylates of formula:

$$CH_2=C(R_1)COOR_2,$$

with $R_1=H$ or $CH_3$ and $R_2$ a group comprising 1 to 22 C, perfluoroalkyl (meth)acrylates of formula:

$$CH_2=C(R_1)COO-(CH_2)_n-C_{n'}F_{2n'+1},$$

with $R_1=H$ or $CH_3$, $n=1-4$ and $n'=1-14$, vinyl acetate, styrene, versatic esters, acrylic acid, methacrylic acid, acrylamide, ethylene glycol dimethacrylate, and the like.

The cationic dispersions of the invention have a solids content of between 20% and 50%, preferably between 40% and 50%, and a particle size of between 50 nm and 300 nm with a mean particle size preferably of less than 100 nm. They have very good compatibility with the starches liable to be used in the size press, even at high temperature, whether these are native starches, weakly anionic starches or cationic starches. They have a low viscosity, preferably of less than 100 mPa.s for a solids content of 41%. They have very good stability over time, very good mechanical stability and very good resistance to the freezing/thawing cycle. They confer very good hydrophobicity on the papers treated, at treatment levels far below those of an equivalent anionic emulsion. In particular, they make possible the surface treatment of papers of test liner type intended for board packing, where the papers are required to have very good hydrophobicity. They also make it possible to use, inter alia, a starch and pigments which are cationic during the surface treatment of the paper and to obtain very good ink-jet printability. This is because the particles present in the printing inks are generally anionic and will attach more easily to the surface of the paper if cationic components are present.

Processes for the treatment of paper by external or internal sizing are described in the applicational examples.

EXAMPLE

The following examples illustrate the invention without limiting the scope thereof.

Synthesis Examples

Example 1
Synthesis of the Cationic Surface-active Agent

This example describes the process for the synthesis of an imide derivative of a styrene-maleic anhydride copolymer denoted by SMA.

Dimethylpropylenediamine (DMAPA) and then SMA are first of all introduced, at ambient temperature, into an electrically heated two-litre reactor equipped with a stirring device suitable for viscous media. The reaction mixture is then heated to 150° C. before starting the stirring and is then brought to 200° C. From this moment on, stationary conditions are maintained for 75 minutes before the imidized SMA is extruded via the bottom valve of the reactor into a liquid nitrogen bath. The imidized SMA obtained is subsequently milled.

For Example S1-1, the reaction mixture comprises 170 g of DMAPA and 830 g of an SMA copolymer composed of 79.8% by mass of styrene and 20.2% by mass of maleic anhydride with a number-average molecular mass of 3000 (commercially available under the name of SMAO EF40 from Elf Atochem S. A.).

A powdered copolymer S1-1 is obtained, the characteristics of which are as follows:

Residual DMAPA=600 ppm
Tg=112° C.
Acid number=7.5 mg KOH/g.

Examples S1-2, S1-3 and S1-4

The same type of test can be carried out with other copolymers of styrene and of maleic anhydride exhibiting other styrene/maleic anhydride ratios, the nature of the products employed, the amounts used and the final characteristics of the products obtained being summarized in the following table:

| Reference | S1-2 | S1-3 | S1-4 |
|---|---|---|---|
| SMA nature | SMA ® 1000 | SMA ® 2000 | SMA ® 3000 |
| Amount of SMA (g) | 690 | 760 | 800 |
| Amount of DMAPA (g) | 310 | 240 | 200 |
| Acid number (mg KOH/g) | 7 | 2.6 | 10.6 |
| Level of residual DMAPA (ppm) | 600 | 600 | 600 |
| Tg (° C.) | 82 | 80 | 91 |

Example 2
Dissolution of the Cationic Surfactant (SUR)

171 g of the SUR S1-1, 644 g of water and 39 g of glacial acetic acid are introduced into a three-necked glass reactor with a capacity of 1 liter equipped with a central stirrer, a condenser, a temperature probe and a device for introducing acetic acid. The combined reactants are heated to 60° C. and kept stirring until the oligomer has completely dissolved.

The aqueous solution S2-1 obtained has an S1-1 concentration of approximately 20%. The dissolution of the SUR can optionally be carried out directly in the polymerization reactor as a preliminary stage of Example S3-1.

Example 3
Synthesis of the Cationic Dispersion

This example describes the synthesis of a cationic dispersion according to the invention.

642 g of aqueous solution S2-1 comprising 20% of oligomer S1-1 are introduced into a jacketed glass reactor with a capacity of 1 litre equipped with a central stirrer, a condenser, a temperature probe and a device for continuously introducing an initiator solution and a mixture or pre-emulsion of monomers, and the reaction mixture is brought to 85° C.

Furthermore, an initiator solution is prepared by dissolving 3 g of ammonium persulphate in 60 g of demineralized water, and a mixture of monomers is prepared composed of 138 g of styrene and 162 g of butyl acrylate.

When the reaction mixture is at 85° C., the initiator solution and the mixture of monomers are fed in over a period of 2 hours, with stirring and while maintaining the temperature at 85° C.

The reaction mixture is then kept stirring for an additional two hours at 85° C., then cooled to ambient temperature, filtered through a 100 μm cloth and drained to result in the S3-1 dispersion, which exhibits the following characteristics.

Solids content=41%
Viscosity is 35 mPa.s, measured using a Brookfield device at 25° C. according to the Standard
pH=4
Mean diameter of the particles=95 nm
Tg=25° C.

Comparative Example 1

A sizing agent is synthesized in the same way as that disclosed in Example 1 of Patent FR 9606737, to give an anionic emulsion S4 stabilized by a styrene-maleic anhydride copolymer neutralized with ammonia, composed of 74.3% by mass of styrene and 25.7% by mass of maleic anhydride. This emulsion is therefore the anionic equivalent of the emulsion S3-1.

This emulsion S4 exhibits the following characteristics:

Solids content=23.5%
Brookfield viscosity at 25° C.=20 mPa.s
pH=8.85
Mean diameter of the particles=55 nm
Tg=25° C.

Applicational Examples

Three papers are surface treated using a laboratory-scale size press.

The first two, of printing and writing type, have a grammage of 80 g/m$^2$ and are sized with alkyl ketene dimer (Aquapel® 315 from Hercules, hereinafter AKD) at a level of 0.2% or 0.6% with respect to the weight of the paper.

Another paper of the test liner type intended to be used for the packing board application has a grammage of 130 g/m$^2$ and was not subjected to any internal sizing.

The following two tests were carried out in order to measure the hydrophobicity and the resistance to penetration by aqueous solutions of the papers treated:

Cobb test: this test is well known to a person skilled in the art and is described in NF Standard EN 20535-ISO 535. The amount of water absorbed after a given time is given in g/m$^2$. In this instance, the Cobb test is carried out with a contact time of 60 seconds (Cobb$_{60}$) or of 30 minutes (Cobb$_{1800}$)

HST test: this test is carried out according to Tappi Test Methods T Standard 530 OM-96. The papers to be tested have a size of 6×6 cm and are subjected, on one face, to a green ink (prepared with 1.25% of Naphthol Green B dye, 1% of formic acid and the remaining percentage of demineralized water). The penetration time of the aqueous ink is determined by reflection of a light source on the opposite face when the percentage of reflection reaches 80%.

Example A1

This example shows the advantage of the sizing agents according to the invention in the surface treatment of printing and writing papers with regard to their resistance to water and to penetration of the ink. An acceptable printing and writing paper must have a $Cobb_{60}$ of less than 30 and an HST of greater than 100.

The paper treated with 0.2% of AKD is surface sized with an aqueous solution comprising:

3% by weight of weakly anionic starch Amylis® 100 P (Roquette)

0.25% and 0.5% by weight of active material of the emulsions S3-1 and S4

The solution being brought to 100% by addition of the necessary complementary demineralized water.

The following results clearly show the superiority of the application according to the invention at a low treatment amount compared with the application using an anionic sizing agent:

| Products | Starch alone | S3-1 0.25% | S3-1 0.5% | S4 0.25% | S4 0.5% |
|---|---|---|---|---|---|
| $Cobb_{60}$ $(g/m^2)$ | >100 | 27.5 | 22.5 | 71 | 23 |
| HST (s) | 0 | 127 | 197 | 24 | 190 |

Example A2

This example shows the advantage of the sizing agents according to the invention in the surface treatment of printing and writing papers using a cationic starch. The latter introduces significant advantages with regard to the printability properties.

The papers treated with 0.2% and 0.6% of AKD are surface sized with a solution comprising:

3% by weight of cationic starch Catosize® 240 (National Starch)

0.5% by weight of active material of the emulsions S3-1 and S4

The solution being brought to 100% by addition of the necessary complementary demineralized water.

The following results, in comparison with those of Example A1, clearly show the compatibility of the dispersion according to the invention with any type of starch. Whereas the properties of the emulsion S3-1 are reinforced in the presence of a cationic starch, those of the emulsion S4 decline and are even inferior to those of the starch alone for the paper with 0.6% of AKD, due to an incompatibility in the sizing slip.

| Products | Starch alone | S3-1 | S4 |
|---|---|---|---|
| Paper with 0.2% of AKD | | | |
| $Cobb_{60}$ $(g/m^2)$ | 100 | 20.7 | 65 |
| HST (s) | 0 | 300 | 8 |
| Paper with 0.6% of AKD | | | |
| $Cobb_{60}$ $(g/m^2)$ | 52.5 | 19.5 | 59.5 |
| HST (s) | 9 | 120 | 7 |

Example A3

This example shows the advantage of the sizing agents according to the invention in the surface treatment of packing board papers, with regard to their resistance to water. For these papers, very good resistance to water is required over long periods of time. An acceptable paper of test liner type intended for packing board must have a $Cobb_{1800}$ equal to or less than 120.

The paper of test liner type described above is surface sized with a solution comprising:

8% by weight of weakly anionic starch Amylis® 100 P (Roquette)

0.7% and 1.2% by weight of active material of the emulsions S3-1 and S4

The solution being brought to 100% by addition of the necessary complementary demineralized water.

The following results demonstrate the possibility of treating, with reasonable amounts of sizing agent according to the invention, papers of test liner type which have not been subjected to any internal sizing.

| Products | Starch alone | S3-1 0.7% | S3-1 1.2% | S4 0.7% | S4 1.2% |
|---|---|---|---|---|---|
| $Cobb_{60}$ $(g/m^2)$ | 200 | 30 | 20 | 61 | 28 |
| $Cobb_{1800}$ $(g/m^2)$ | 250 | 150 | 105 | 165 | 150 |

Example A4

This example describes the use of the cationic dispersion of the invention as internal sizing agent.

The paper is obtained according to the process which consists in preparing handsheets on a Franck device starting from a pulp beaten to a certain Schopper-Riegler degree of drainability (see NF Standard Q 50003). The sizing agent is added to the fibrous suspension composed of 5 g/l of fibres in water. Stirring is continued for 3 minutes. The handsheet is prepared at a mean grammage of 65 $g/m^2$, after draining, dewatering and drying for 5 minutes at 95° C. The pulp used in this instance is composed of 50% short fibres and 50% long fibres and has a Schopper-Riegler degree of 25.

1% of sizing agent with respect to the dry fibrous matter is added. The sizing agents used are emulsions S3-1 and S4, as well as AKD (Aquapel® 315 from Hercules). The handsheets treated with AKD are subjected to accelerated maturing in an oven for 10 minutes at 110° C.

| Sizing agent | None | AKD | S3-1 | S4 |
|---|---|---|---|---|
| Cobb₆₀ | >100 | 42 | 24 | >100 |

As is seen in the light of these results, the emulsion S3-1 gives entirely satisfactory sizing results without a retention agent, whereas the performance is mediocre with AKD used alone. Furthermore, no maturing stage is necessary. The anionic emulsion does not give any result because it is not attached to the fibres.

What is claimed is:

1. Process of treating paper or boards comprising using a composition prepared by a process comprising emulsion polymerizing at a temperature ranging from 30 to 100° C. one or more monomers in the presence of 30 to 50% by weight, with respect to the one or more monomers, of a surfactant consisting of imidized styrene/maleic anhydride copolymer, the solids content of the dispersion being 20 to 50%, as a paper sizing agent.

2. Process of claim 1 wherein no retention agent is used and immediate sizing is obtained.

3. Process of claim 1 where one or more additional sizing agents are used as surface sizing agents.

4. Process of claim 1 wherein the additional sizing agent (s) are selected from starches.

5. Process of claim 1 wherein the weight ratio of styrene to maleic anhydride of the copolymer is about 1/1 to 6/1.

6. Process according to claim 5 wherein the ratio is 2/1 to 4/1.

7. Process according to claim 1 wherein the copolymer has a number average molecular weight of about 500 to 20,000.

8. Process according to claim 7 wherein the number average molecular weight is 2000 to 5000.

9. Process according to claim 1 wherein the copolymer has a degree of imidization of about 50 to 100%.

10. Process according to claim 1 wherein the copolymer is imidized by dimethylpropylene diamine.

11. Process according to claim 1 wherein the monomer(s) are one or more of either (A) hydrophobic monomers selected from the group consisting of
(i) alkyl (meth)acrylates of the formula (I):

$$CH_2=C(R_1)COOR_2 \qquad (I)$$

wherein $R_1$=H or $CH_3$; and $R_2$ is a group having 1 to 22 carbon atoms;
(ii) perfluoroalkyl (meth)acrylates of formula (II):

$$CH_2=C(R_1)COO-(CH_2)_n-C_{n'}F_{2n'+1} \qquad (II)$$

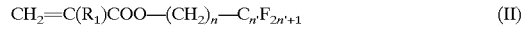

wherein $R_1$=H or $CH_3$; n=1–4; and n'=1–4;
(iii) vinyl acetate;
(iv) styrene; and
(v) versatic esters; and
(B) hydrophilic monomers.

12. Process according to claim 11 wherein the monomer (s) comprise one or more hydrophobic monomers selected from the group consisting of methyl acrylate, ethyl acrylate, butyl acrylate, 2-ethylhexyl acrylate, and methyl methacrylate.

13. Process according to claim 11 wherein the monomers (s) comprise one or more relatively hydrophilic monomers selected form the group consisting of acrylic acid, methacrylic acid, acrylamide, and ethylene glycol (meth)acrylate.

14. Process according to claim 1 wherein the dispersion has particles of a size of about 50 to 500 nm.

15. Process according to claim 14 wherein the particle size is about 50 to 300 nm.

16. Process according to claim 1 wherein the dispensed emulsion polymer has a glass transition temperature of about −70° C. to 100° C.

17. Process according to claim 16 wherein the glass transition temperature is about 0 to 50° C.

18. Process for external sizing or internal sizing of paper or board comprising (A) an aqueous cationic dispersion and (B) starch in a weight ratio of (A) cationic dispersion to (B) starch of about 5:95 to 50:50, the dispersion prepared by a process comprising emulsion polymerizing at a temperature ranging from 30 to 100° C. one or more monomers in the presence of 30 to 50% by weight, with respect to the one or more monomers, of a surfactant consisting of imidized styrene/maleic anhydride copolymer, the solids content of the dispersion being 20 to 50%.

* * * * *

UNITED STATES PATENT AND TRADEMARK OFFICE
CERTIFICATE OF CORRECTION

PATENT NO. : 6,830,657 B1  
DATED : December 14, 2004  
INVENTOR(S) : Isabelle Betremieux et al.

It is certified that error appears in the above-identified patent and that said Letters Patent is hereby corrected as shown below:

Column 9,  
Line 28, after "claim" delete "1"  
Line 28, after "claim" insert -- 3 --.

Signed and Sealed this

Nineteenth Day of April, 2005

JON W. DUDAS  
*Director of the United States Patent and Trademark Office*